G. P. VAN KEUREN.
HORSE COLLAR PAD.
APPLICATION FILED AUG. 26, 1911.
1,012,763.
Patented Dec. 26, 1911.
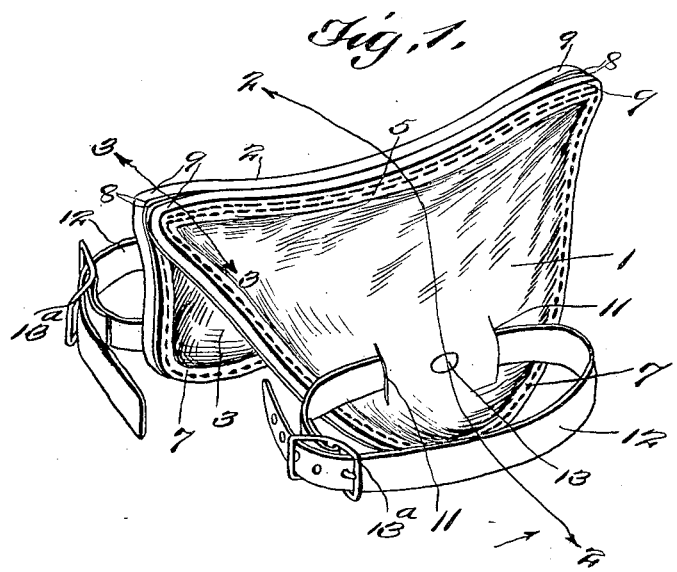
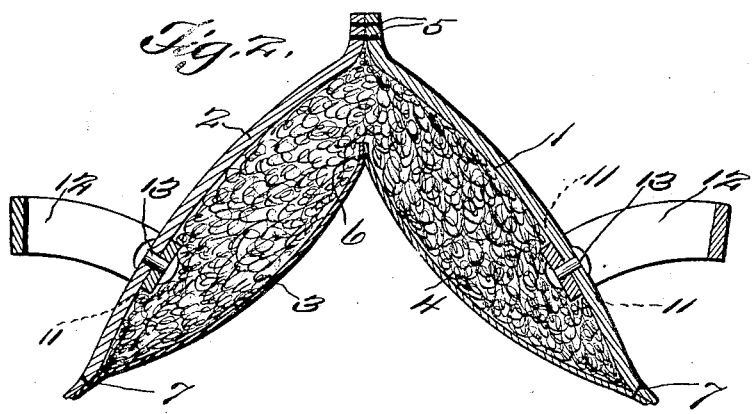
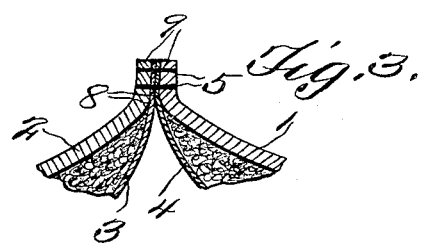
Witnesses
Francis G. Boswell,
C. E. Frothingham,
Inventor
Geo. P. Van Keuren
By D. Swift
Attorney

UNITED STATES PATENT OFFICE.

GEORGE P. VAN KEUREN, OF LYNDONVILLE, NEW YORK.

HORSE-COLLAR PAD.

1,012,763.  Specification of Letters Patent.  Patented Dec. 26, 1911.

Application filed August 26, 1911. Serial No. 646,235.

*To all whom it may concern:*

Be it known that I, GEORGE P. VAN KEUREN, a citizen of the United States, residing at Lyndonville, in the county of Orleans and State of New York, have invented a new and useful Horse-Collar Pad; and I do hereby declare the following to be a full, clear, and exact description of the invention, such as will enable others skilled in the art to which it appertains to make and use the same.

This invention relates to a new and useful protecting pad, for protecting a horse's neck from the galling action of the collar.

The main feature of the invention is to construct the pad of four plies, two outside plies, one on each side stitched together at their upper edges, and two inside plies, stitched together at their upper edges, which last named upper edges are spaced apart from the first upper edges, with the exception that at the forward and rear ends of the pad, the last named edges are stitched between the first named edges of the outer plies. The inner and outer plies are stitched together at their lower and side edges.

The invention comprises further features and combination of parts, as hereinafter set forth, shown in the drawings and claimed.

In the drawings:—Figure 1 is a view in perspective of a pad, constructed in accordance with the invention. Fig. 2 is a sectional view on line 2—2 of Fig. 1. Fig. 3 is a sectional view on line 3—3 of Fig. 1.

Referring more especially to the drawings 1, 2, 3 and 4 designate four plies of leather or other suitable material. The outer plies are stitched together at their upper edges, as shown at 5, while the plies 3 and 4 are stitched together as shown at 6. The plies 2 and 3 and the plies 1 and 4 are stitched together as shown at 7. The forward and rearward portions 8 of the plies 3 and 4 are brought together between the forward and rearward portions 9 of the plies 1 and 2, and secured in such positions by the stitches 5. In this manner a continuous pocket for the hair padding, from one side of the pad to the other is formed. The plies 3 and 4 are constructed from sheep skin, so as to absorb the moisture or perspiration from the horse, while the outside plies 1 and 2 are constructed of heavy leather, which constitutes a substantial, durable and efficient support for the horse collar, or the hames, so as to prevent the collar or the hames from contacting with the horse's neck. This pad may take the place of the collar, if desired, for the hames to ride on, or it may be used beneath the saddle of a harness.

The plies 1 and 2 are provided with oppositely arranged slits or cuts 11, through which the straps 12 pass. These straps are riveted to the plies 1 and 2 as shown at 13. The straps are provided with suitable buckles 13ª, for rendering them adjustable. The hames or the horse collar are held from displacement by the straps.

From the foregoing it will be noted that there has been devised a novel, simple and efficient pad, and one which has been found to be practicable in every way.

The invention having been set forth, what is claimed as new and useful is:

A harness pad comprising, a pair of outer plies stitched together at their upper edges, a pair of inner plies stitched one to each of the outer plies about their side and lower portion, the inner plies having their upper edge portions stitched together and spaced apart from the upper edges of the outer plies, thus forming a pocket from one side of the pad to the other, and a hair stuffing in the pocket, the forward and rearward portions of the upper edge portions of the inner plies being stitched between the upper edge portions of the outer plies, at the forward and rearward portions of the pad.

In testimony whereof I have signed my name to this specification in the presence of two subscribing witnesses.

GEORGE P. VAN KEUREN.

Witnesses:
C. E. STANGLAND,
WALLACE I. WELD.